(12) United States Patent
Fraleigh

(10) Patent No.: US 6,865,845 B2
(45) Date of Patent: Mar. 15, 2005

(54) SYSTEM, METHOD AND APPARATUS FOR CONTAINER PLANT PRODUCTION

(75) Inventor: Jay Fraleigh, Madison, FL (US)

(73) Assignee: Fraleigh Nursery LLC, Madison, FL (US)

( * ) Notice: Subject to any disclaimer, the term of this patent is extended or adjusted under 35 U.S.C. 154(b) by 0 days.

(21) Appl. No.: 10/642,389

(22) Filed: Aug. 15, 2003

(65) Prior Publication Data

US 2004/0111963 A1 Jun. 17, 2004

Related U.S. Application Data

(60) Provisional application No. 60/403,806, filed on Aug. 15, 2002.

(51) Int. Cl.[7] ................................................ A47G 13/02

(52) U.S. Cl. ........................ 47/58.1 SE; 47/31.1; 47/75

(58) Field of Search ................................ 47/58.1 SE, 31.1, 47/32, 32.3, 21.1, 32.7, 75, 18, 66.7; A47G 13/02

(56) References Cited

U.S. PATENT DOCUMENTS

| | | | |
|---|---|---|---|
| 1,377,566 A | | 5/1921 | Eckart |
| 1,846,274 A | | 2/1932 | Otwell |
| 1,930,939 A | | 10/1933 | Horner |
| 1,936,988 A | | 11/1933 | Otwell |
| 1,954,424 A | | 4/1934 | Otwell |
| 3,328,913 A | * | 7/1967 | Vogt .............................. 47/73 |
| 3,384,993 A | | 5/1968 | Kane |
| 4,357,884 A | * | 11/1982 | Rast, Jr. ...................... 111/114 |
| 4,437,263 A | * | 3/1984 | Nir et al. .................. 47/1.01 R |
| 5,081,791 A | * | 1/1992 | Baron et al. .................. 47/65.8 |
| 5,117,580 A | * | 6/1992 | Brown ............................. 47/9 |
| 5,295,324 A | | 3/1994 | Baba et al. |
| 5,709,049 A | * | 1/1998 | Baird ......................... 47/21.1 |
| 6,223,466 B1 | * | 5/2001 | Billings ......................... 47/79 |
| 2003/0213171 A1 | * | 11/2003 | Kruer et al. ................ 47/62 E |

* cited by examiner

*Primary Examiner*—Teri Pham Luu
*Assistant Examiner*—Susan C. Alimenti
(74) *Attorney, Agent, or Firm*—Smith, Gambrell & Russell, LLP

(57) ABSTRACT

The present invention provides a process and apparatus for producing container plants in a covered raised-based environment.

17 Claims, 7 Drawing Sheets

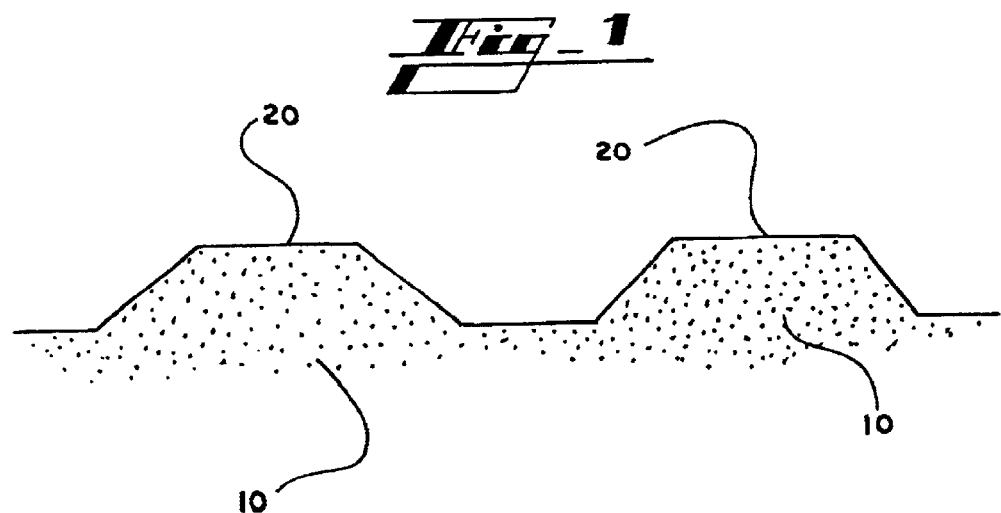
Fig_1
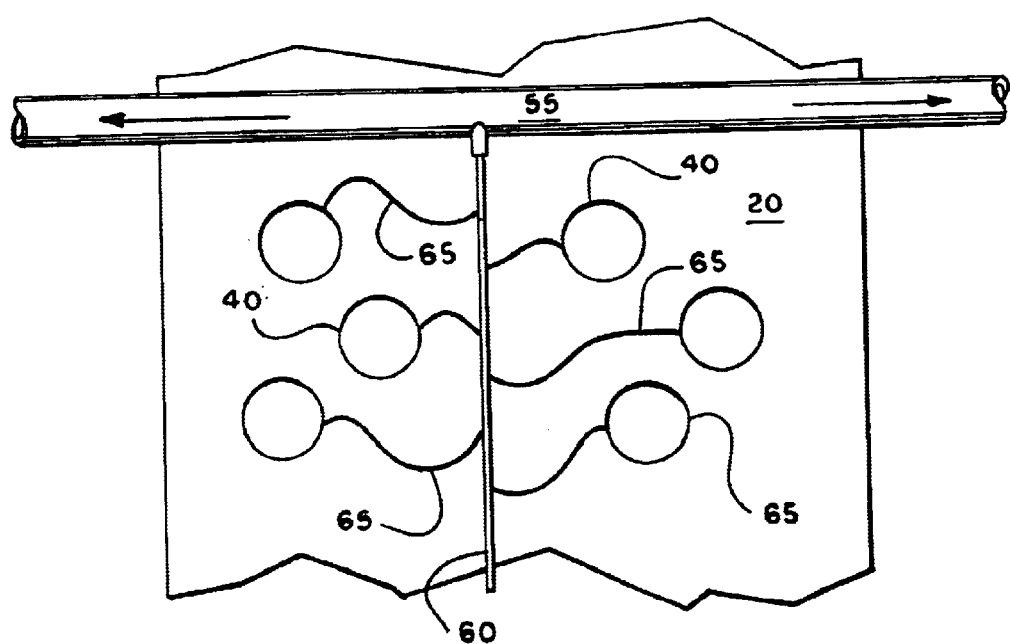
Fig_5

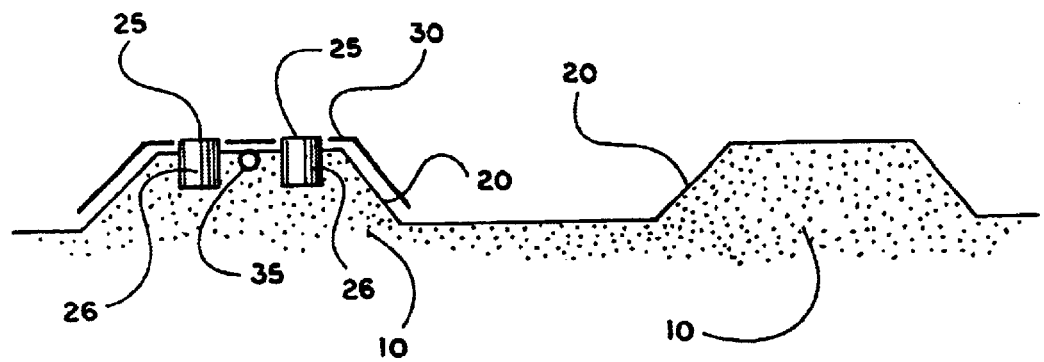
Fig_3
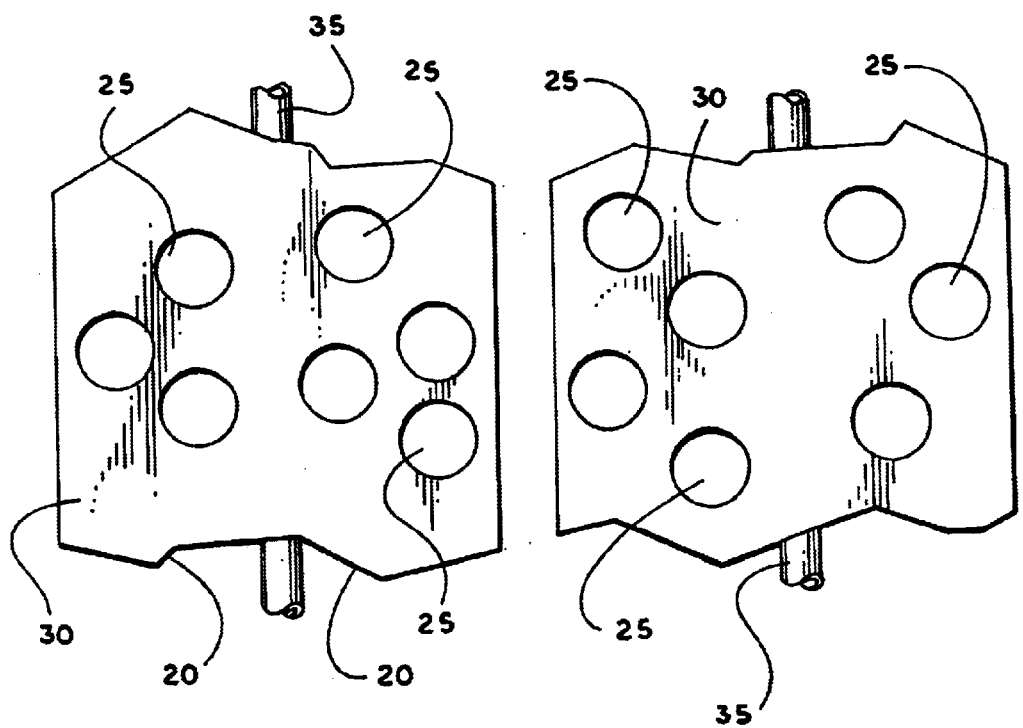
Fig_4

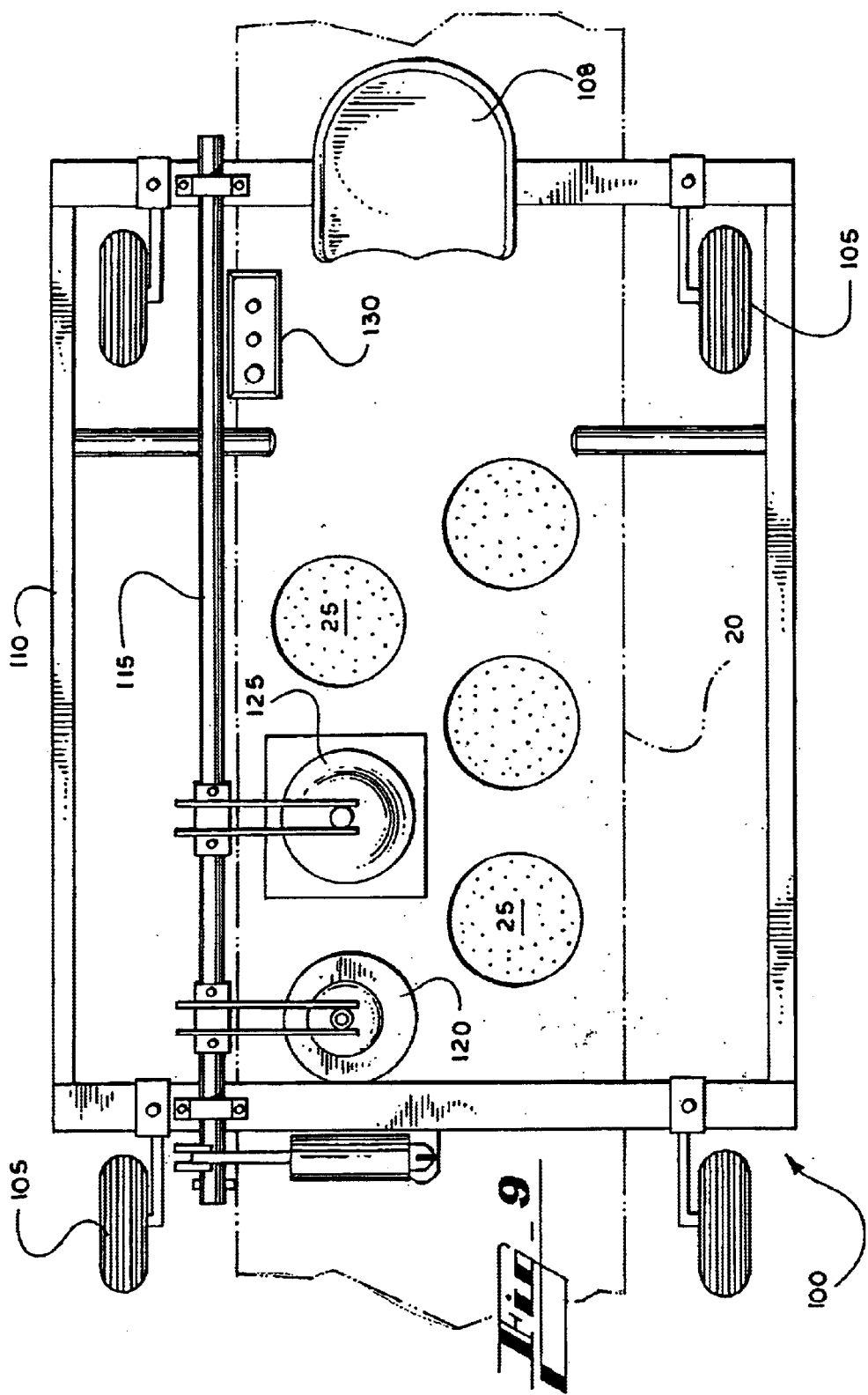

SYSTEM, METHOD AND APPARATUS FOR CONTAINER PLANT PRODUCTION

CROSS-REFERENCE TO RELATED APPLICATION

This application claims the benefit of priority of U.S. provisional application No. 60/403,806, filed Aug. 15, 2002, which is incorporated herein by reference.

BACKGROUND

Current nursery container production practices of ornamental plant material present considerable expenses for labor, construction, and water management. For example, it is general practice to water container plant material ranging in sizes from 1 gallon to 5 gallon under overhead irrigation to create a rain-like effect. However, overhead watering practice is being challenged due to environmental issues of water management for container nurseries along with increasing water shortage issues.

Under current overhead watering practices (Best Management Practices: Guide for Producing Container-Grown Plants (1997-Southern Nurserymen's Association)), irrigating 1 acre of container plant area with 1 inch of water requires 27,000 gallons of water. Of these 27,000 gallons, 90% (24,310 gallons) is wasted as run-off. Under environmental regulations, this run-off can require a collection basin to collect about 90% of the applied irrigation water per acre of container area.

Irrigation run-off from using overhead watering thus creates a need to implement costly water management practices. Such water management practices include: area stabilization (erosion), collection basins, management of storm water run-off, management of pesticide run-off, management of nutrient extraction (nitrogen & phosphorus leaching), management of liquid fertilizer run-off, management of recycled run-off water for irrigation use and management of culverts and ditches.

While new management practices in growing 1 to 5 gallon container plant material are being implemented, there has been limited advances in reducing run-off, water usage, labor cost, environmental concerns and construction costs. In traditional 1 to 5 gallon container growing, a potted plant is placed on top of a plastic or combination of plastic and weed mat barrier or gravel beds. The plastic stops the water that fills from the overhead sprinkler head or rain from absorbing into the surrounding soil that the container plants are placed on. This practice moves water away from the growing area to keep the planting area dry during times when the plant is not being watered. The plastic controls weeds in the growing area.

Over the years, growers found themselves having to replace the plastic due to solar breakdown, tearing and certain weed penetration through the plastic. In recent growing practices, growers are now incorporating a weed mat barrier over the top of plastic. This weed mat barrier is a woven type of polyethylene and/or polypropylene type material that allows water to pass through but does not break down under extreme solar conditions, does not tear easily, and weeds cannot penetrate it. The mat barrier therefore can last for several years.

By installing the plastic underneath the barrier, irrigation and rain water are able to flow away from the growing area and standing water is reduced. This result is beneficial as standing water in growing areas increases the chance for fungal diseases in the growing area. However, this type of growing practice over large areas requires that an extreme amount of irrigation and storm water run-off be managed in compliance with environmental standards.

Other growing practices incorporate growing potted plants on gravel beds, but these practices are very costly. In addition, gravel beds used in sandy regions do not control weeds in growing areas due to rapid leaching of pre and post herbicides.

Current growing practices thus are highly limited by the extensive amounts of construction cost needed to excavate the growing areas to contain run-off of irrigation and storm water. Accordingly, there is a need for an environmentally-friendly plant-production method that significantly reduces the time and costs of water management construction activities.

SUMMARY OF THE INVENTION

The present invention answers this need for an environmentally-friendly and less expensive container plant material production method by modifying growing methods used in growing fruits and vegetable in plastic covered raised beds.

In vegetable and fruit farming, the raised beds are covered, for example, with solid plastic 2 to 5 mills thick and in colors such as black, white, silver, and clear. It will be appreciated that other colors may also be used. Typically such beds range in widths of 10" to 36' and the side walls of the raised beds range from ground level to 8" tall. However, it will again be appreciated that other widths and heights are also known in the art. In the construction of these prior art raised beds, a drip irrigation line is installed under the plastic of the raised bed to irrigate, fertilize and inject pesticides for growing purposes.

The present invention also uses the raised bed technique, but the bed is covered, in one embodiment, with woven weed mat constructed of polyethylene, polypropylene or a polyolefin copolymer product—referred to in the nursery trade as "ground cover", "weed mat", and/or "weed barrier." By using this material, a grower can use a raised bed area for growing container plants for several years if desired. Also, a "weed barrier" allows water to move through the covering while also stabilizing the soil in the raised bed. Using weed barrier products further eliminates the need for a grower to use a soil fumigant.

In another embodiment, the raised beds can alternatively or additionally be covered with standard plastic if the grower desires. Plastic cover can be used for short-term crops; however, it is recommended that the grower inject a soil fumigant.

During the installation of the bed covering, in an embodiment of the invention, the drip irrigation tube is installed under the covering. This drip irrigation is not used to irrigate the plant itself, as the present invention is directed to container plants, but for growing enhancement and protection of the plants from extreme weather conditions (both hot and cold). Also, maintaining moisture in the soil of the raised bed reduces evaporation of water from the container plant growing media i.e. (substrate) therefore reducing water usage. In other embodiments of the invention, heated water, such as from a boiler or water heater unit may by delivered through the driptape to maintain ground temperature in cold weather.

The ability to control temperatures in growing substrate of container plants has been proven to be very beneficial in both extreme hot temperatures to reduce heat stress and to provide winter protection of root zone by maintaining warm moist soil surrounding the container. Burying the roots in the substrate also creates a natural barrier for the roots, just as if they were planted directly into the ground.

Under present growing methods, when Fall and Winter seasons arrive, most of the smaller container plants that are spaced on plastic growing areas need to be jammed or taken to a cold frame structure that will be covered with plastic for winter protection. The present invention drastically reduces the movement of plants to protect them from the cold. Plant material can be covered with a moveable cold frame structure or frost blanketed material where they are growing in the raised bed for added protection and thereby eliminating or reducing the need to move the plant material.

In the majority of cold damage cases involving container plants, the damage is directed to the roots due to the fact that the plants roots are grown above ground level, therefore exposing the roots to damaging cold temperatures. Nurseries today thus significantly invest for winter protection. The majority of this expense is the labor of handling each plant several times during the course of a winter season.

By contrast, the current invention reduces or eliminates having to jam container grown plant material together for winter protection. The growing technique of the present invention allows the container plant to remain in the raised bed until it is ready for sale.

Heat stress on container nursery stock also damages or stresses plant material during summer seasons. Plants grown above ground in typically black containers absorb extremely high temperatures on the root system. This type of stress causes plants to stop growing and causes root damage to the plant.

The present invention, by contrast, allows the plant to be maintained in a natural type growing situation. Also, by having the ability to keep the soil of the raised bed moist, a better cooling climate for the root system of the plant is provided which not only avoids interruption of growth, but actually accelerates growing. Creating this optimum growing climate through the raised bed and moist soil surrounding the contained root system thus gives the grower of container plants an added advantage in getting the plant to market faster.

Those skilled in the art will appreciate that growing smaller container plant material requires a great deal of handling during the time it takes for the plant to mature for sale. Most smaller container plants are potted up at a potting area using a potting machine or by hand at a central location. They are then placed on nursery wagons which are pulled out to the growing area where they are to be placed. Due to the size of the 1 to 5 gallon plant material and their susceptibility to cold damage in winter, the majority of all growing plants are placed on a plastic or weed mat in a jammed formation where each pot touches the plant next to it. After the plant has grown in size, these plants are then spaced to allow for top growth and to become mature sellable plants.

During the growing time that plants mature in their container, they easily tip over due to wind and during the spraying of insecticides and fungicides. When a plant is tipped over, it needs to be stood up again to allow for watering. Plants that are not stood up will dry out rapidly and become stressed and decline in value due to that stress. Many plants are consequently ultimately thrown away.

This invention reduces this extra labor and waste cost. By growing the container plant in a socket hold in a raised bed it will not blow over due to wind or spraying. The present invention therefore reduces the high labor and waste costs associated with standing up plants at traditional container nurseries.

Watering plant material under the present invention is also more efficient than under the conventional overhead irrigation methods. As stated, the majority of small container plants are irrigated using impact sprinkler heads creating a rain like effect. Maturing container plants are grown on top of plastic, weed mat/barrier over plastic, or gravel formation which causes at least 90% of the water to fall between containers and causing runoff. This inefficient watering creates a large amount of wasted run-off. The new invention creates a growing area that allows the grower to irrigate each container plant individually using microirrigation.

Microirrigation is one of the most efficient means of watering large container plants. Microirrigation has been attempted on smaller containers, but for the most part has been abandoned because of the problems of massive growing areas currently in production. One major problem is plants being blown over and the spray emitters pulling out of the pots. When this happens, the many irrigation tubes and emitters on the ground of growing area restricts regular growing practices and the workers' ability to move freely in the growing area to perform their daily tasks.

The current invention reduces or eliminates these and related problems concerning daily production tasks. As stated, the container plant growing in a socket hole will not blow over. In addition, a pre-sized raised bed growing area with walk-way rows between each raised bed allows workers to perform their daily tasks for growing—such as fertilizing, pruning, checking irrigation, etc. The raised beds keep irrigation tubes in a contained area that are out of the way of workers, yet allow the grower the most efficient growing area climate for container plants.

Accordingly, the present invention creates an entirely new efficient, cost effective way to produce any type of container grown plant that (1) reduces water use up to 80% less than conventional overhead sprinkler, (2) reduces watering time up to 75%, (3) eliminates irrigation run-off, (4) reduces labor cost 25 to 30% by eliminating or reducing spacing, eliminating or reducing the need for jamming for winter or moving plant to cold frame and by eliminating or reducing the need for standing up for blown over plant material; (5) reduces waste; (6) creates more consistent crop; (7) enhances winter protection for root system; (8) enhances summer heat protection for root system; (9) drastically reduces new per acre construction cost; (10) meets and exceeds current Best Management Practices for run-off issues; (11) is environmentally sound; (12) allows for more efficient mechanization; (13) reduces chemical use; (14) accelerates growing rates and (15) reduces nitrogen leaching and fertilizer run-off.

In an alternative embodiment of the present invention, an apparatus is provided for automating the described container plant production methods. In one embodiment, a wheeled-apparatus is provided which straddles the raised beds that will receive the container plant materials. The apparatus is provided with a pivoting in-line burner and auger. The burner raises and lowers to burn a hole in the plastic/fabric covering the raised bed. This burned hole provides the socket opening in the fabric/plastic. The auger follows the burner to dig out the socket of the appropriate diameter and depth in which the plant container will be placed. In certain embodiments the apparatus of the present invention may be pulled by tractor, however, in alternative embodiments the apparatus may be provided with a motor or other self-propulsion means.

In further embodiments of the present invention, the automatic socket creation and digging apparatus may be provided with a plurality of burners and augers to create such number of sockets as may be necessary based on the desired efficiency and acreage to be covered.

In still further embodiments of the present invention, an apparatus may be integrated with or linked to the socket creation and burning apparatus for placing container plants into such socket holes. Accordingly, it will be appreciated that the socket creation and placement of the container plant material may be fully automated or may be a combination of automated steps and manual steps.

BRIEF DESCRIPTION OF THE DRAWINGS

FIG. 1 is a cross-sectional view of a raised bed in an embodiment of the present invention.

FIG. 3 is a cross-sectional block diagram of an embodiment of the present invention.

FIG. 4 is a top plan view of a plurality of raised beds including socket holes in an embodiment of the present invention.

FIG. 5 is a top plan view illustrating the supply of driptubing to containers in an embodiment of the present invention.

FIG. 9 is a top view of a socket creation apparatus in an embodiment of the present invention.

DETAILED DESCRIPTION OF THE INVENTION

Figure 2A:
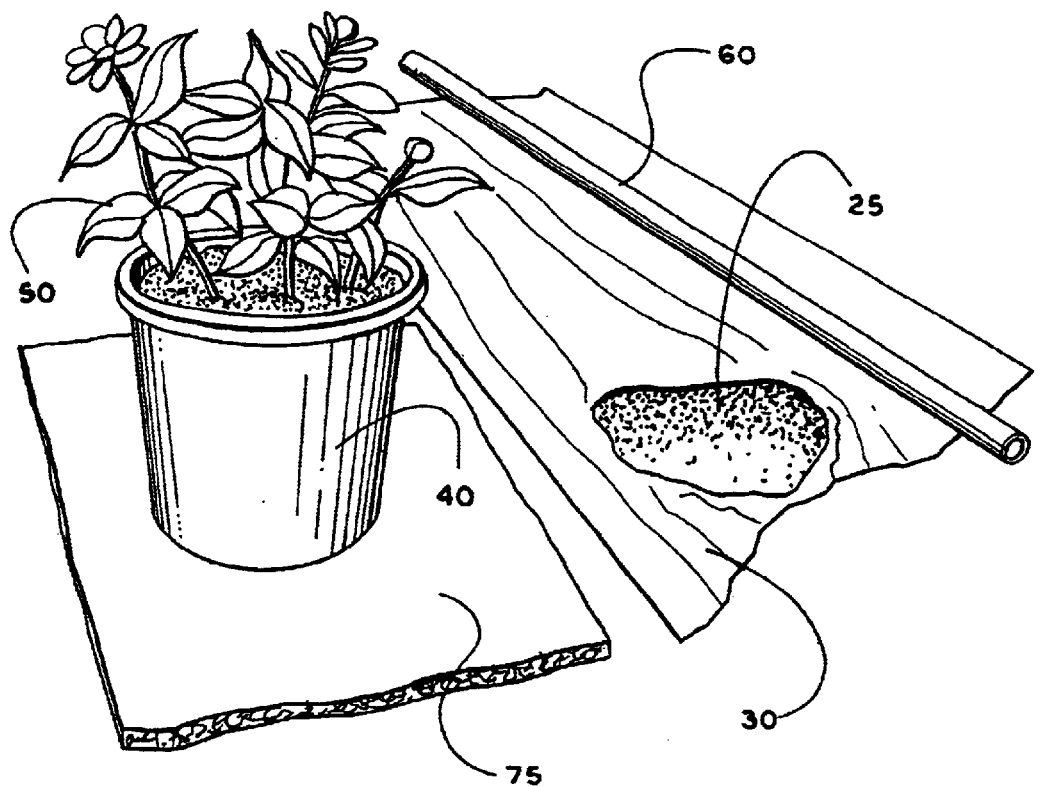
FIG. 2A is a front perspective view of a container plant material and socket hole in an embodiment of the present invention.

In an embodiment of the present invention, a method is provided for the production of container plants in a raised bed environment.

Referring to FIG. 1, soil 10 is prepared by plowing and tilling. Debris is also removed that would impair a presspan for creation of raised bed 20.

The planting beds 20 are formed by a Kenceo Presspan or similar piece of bed forming equipment. Such raised beds 20 are known in the production of vegetables and fruit produce. The bed 20 spacing and size are determined by the needs of the grower.

Referring to FIGS. 2A–4, the raised beds 20 are preferably covered with a weed mat barrier or, alternatively, standard plastic mulch, and a driptape 35 provided under the barrier 30. If plastic is used, a soil fumigant for weed control is preferable.

The driptape 35 is preferably not used in the present invention to water the plants 50 in container 40, but for two other purposes. First, the irrigation driptape 35 maintains moisture in the soil 10 under the weed mat barrier (or plastic mulch) 30. The driptape 35 further controls the temperature of the raised bed 20. The continued moisture allows a grower to keep roots in the container 40 in a cool environment so that the plant 40 can grow in summer heat.

By comparison, prior art methods for growing container plants above ground have shown that temperatures can reach above 100° inside of a container. This heat stress causes the plant to shut down its growth cycle.

Further, the moisture provided by the driptape 35 in the process of the present invention, maintains moisture in the raised bed 20 during the winter months, to act as a heat insulator under the plastic mulch or weed mat barrier 30 for the container 40. In embodiments of the invention, heated water, such as from a boiler or water heater unit may by delivered through the driptape 35 to maintain ground temperature in cold weather.

Socket holes 25 are punched, burned or cut into the plastic or weed mat barrier 30 so that containers 40 containing plants 50 can be placed into the soil 10 of raised bed 20.

After holes 25 are provided in barrier 30, holes 26 are dug into the raised bed 20 for receiving the container plant 50. It will be appreciated that the diameters of holes 25 and 26 and the depth of hole 26 is determined by the size of the container 40 to be placed in the covered raised bed 20.

Figure 2B:
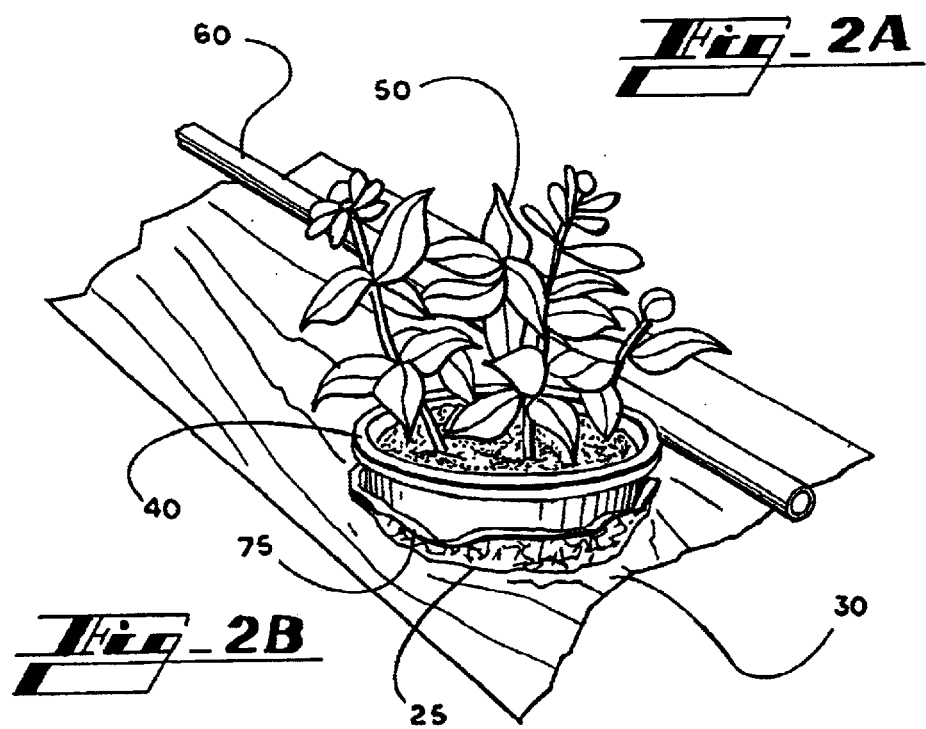
FIG. 2B is a front perspective view from above illustrating the insertion of container plant material into a socket hole in an embodiment of the present invention.

With continuing reference to FIGS. 2A–3, and with specific reference to FIG. 4, holes 25 are provided in the barrier 30 in interchangeable sizes and staggered alignment to accommodate various container sizes. As shown in FIG. 4, the holes 25 are also provided on either side of the driptape 35. The spacing between holes 25 is determined based on the size of the finished crop. As an example, up-right plant material 50 may be spaced closer together than mounding-type ornamentals.

Figures 6A, 6B:
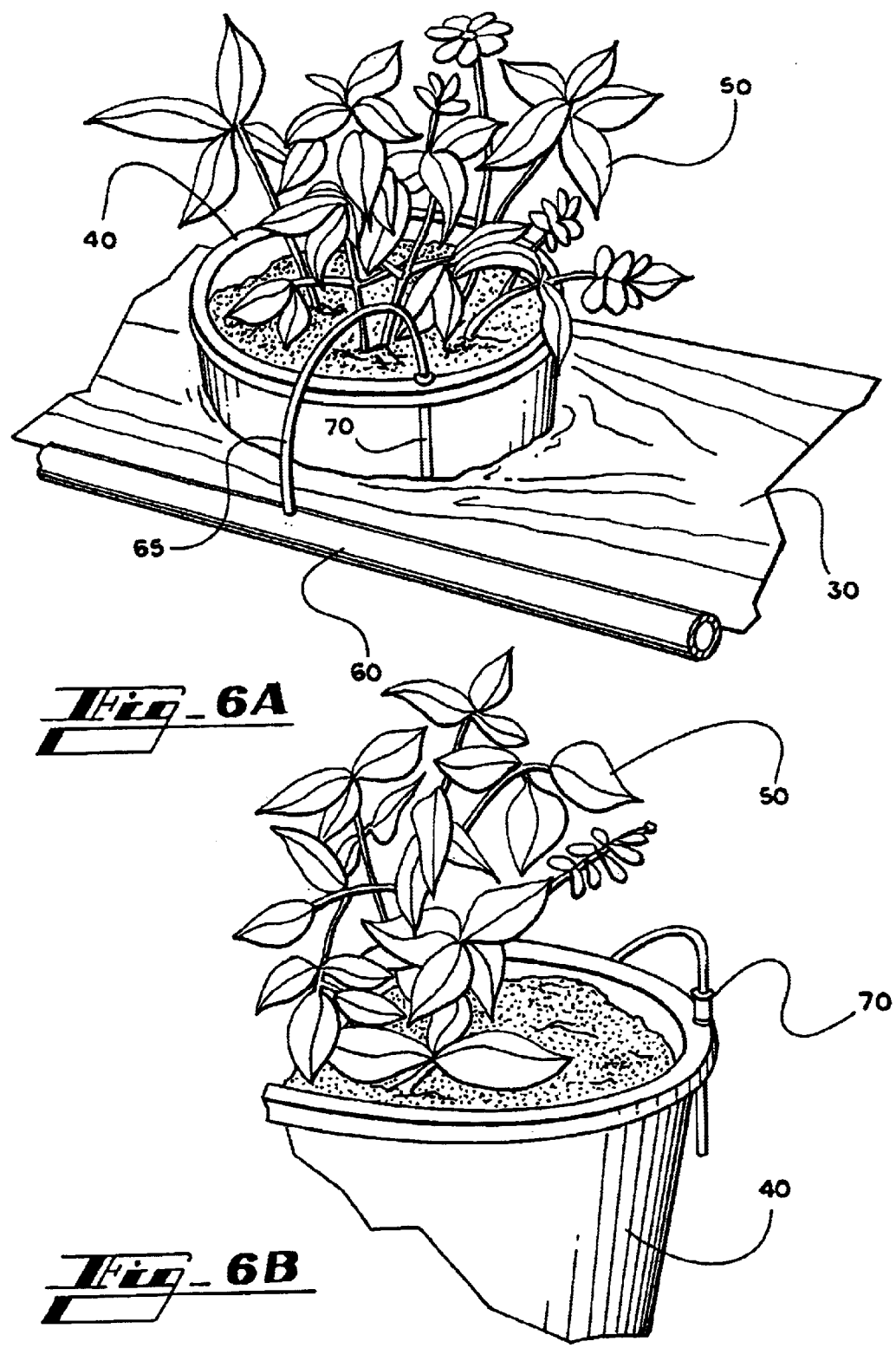
FIG. 6A is a rear perspective view of a spray emitter and container plant in an embodiment of the present invention.
FIG. 6B is a front perspective view of a spray emitter and container plant in an embodiment of the present invention.
Figure 7:
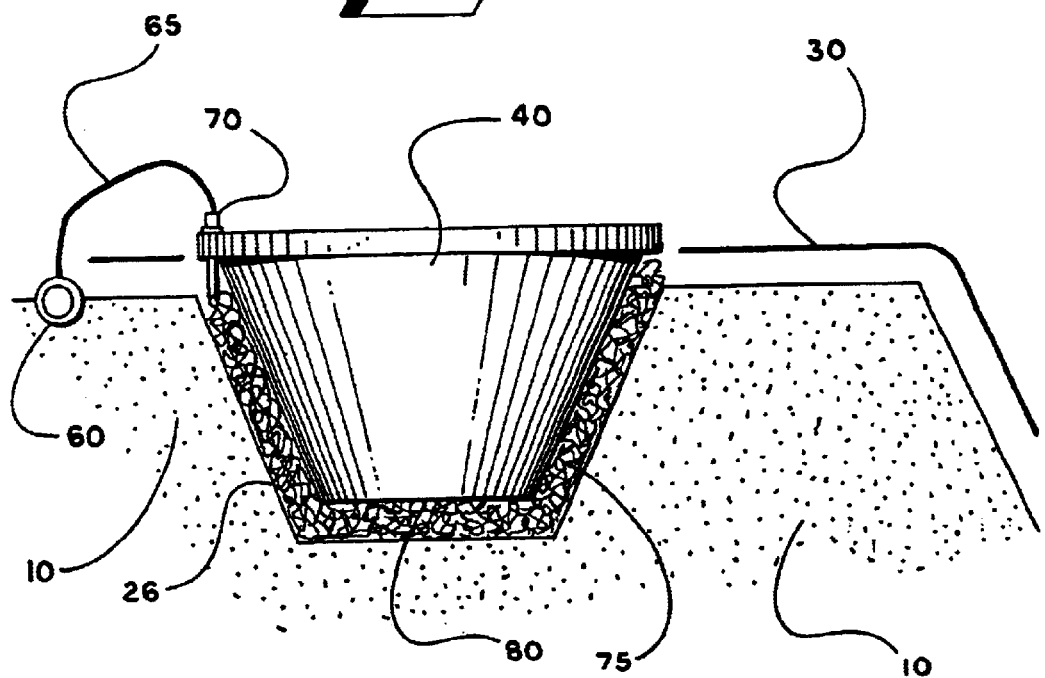
FIG. 7 is a cross-sectional block diagram of a container provided in a socket of a raised bed with a spray emitter in an embodiment of the present invention.

Following preparation of the raised bed 20 with the covering 30, polytubing 60 and driptubing 65 are provided for irrigating container plants 50. The polytubing 60, connected to a main water-providing line 55, is preferably placed in the center of the bed between the holes 25 that contain or will contain containers 40 and plants 50. Driptubing 65 is connected to the polytubing 60 at one end and a spray emitter 70 at an opposite end. Driptubing 65 is provided to the container plants 50 for watering. As shown in FIGS. 6A, 6B and 7, the spray emitter 70 is preferably attached to container 40. In one embodiment, a hole is drilled in the rim of container 40 and the spray emitter 70 inserted therein. It will be appreciated that clamps, stakes, adhesives, ties, and any other adhering or supporting mechanisms may be provided for situating the spray emitter 70 in close proximity of the plant 50 for directing water and/or nutrients to the plant 50.

Accordingly, referring to FIGS. 5, 6A and 7, the container 40 and plant 50 are placed in raised bed 20 with the benefits of both the indicated temperature controls and stability provided by the raised bed, and the benefits of consistent direction and conservation of water from spray emitter 70.

Referring to FIG. 7, in one embodiment of the present invention, the bottom of container 40 may be wrapped with a piece of polypropylene fabric or other wrapping 75 for deterring the plant from rooting into the ground through drain holes 80 provided at the bottom of container 40. It will also be appreciated, that socket holes 26 may be similarly lined with such deterring fabric or barrier 75 to assist in the prevention of such rooting.

In a further embodiment, the fabric 75 may be treated with spin-out product for extra rooting protection.

The foregoing methods may be carried out manually or in an automated environment.

Figure 10:
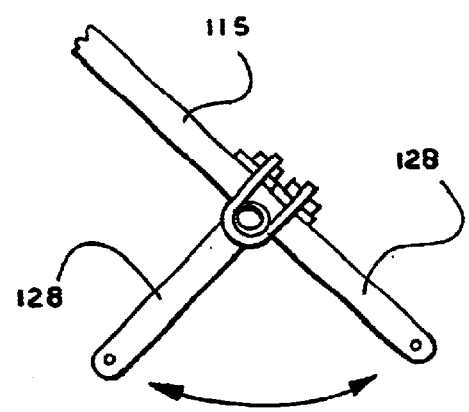
FIG. 10 is a side view of the actuating arm of an auger of a socket creation apparatus in an embodiment of the present invention.
Figure 8:
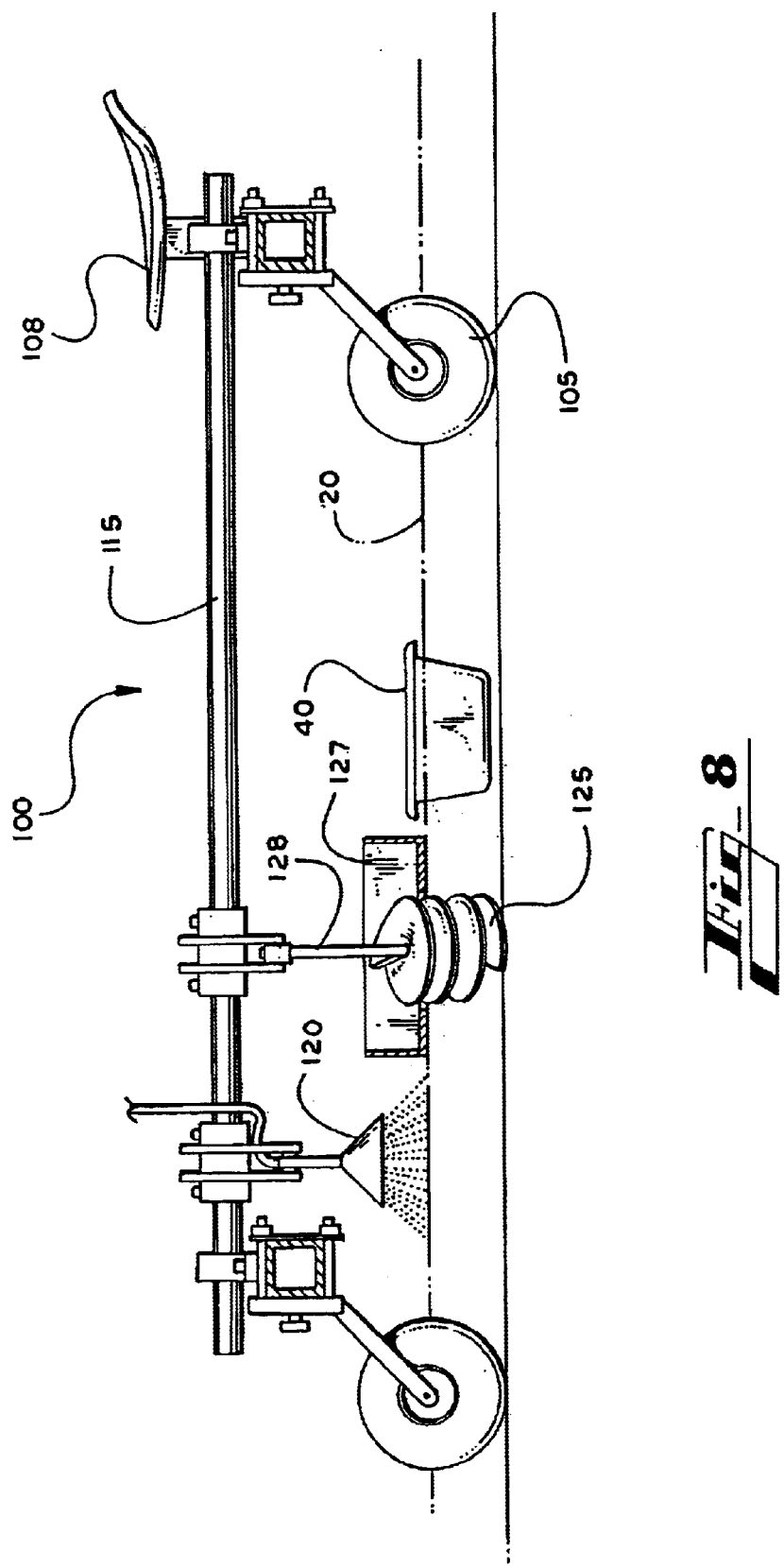
FIG. 8 is a side view of a socket creation apparatus in an embodiment of the present invention.

For example, in an embodiment of the present invention, shown in FIGS. 8–10, a machine 100 may be provided that automates many of the above-described actions.

In one embodiment, apparatus 100 simultaneously provides hole 25 burning functions and hole 26 digging functions for placement of the containers 40.

Machine 100 is similar to a bedder machine and includes a frame 110 with wheels 105 for straddling a raised bed 20. Machine 100 is preferably provided with at least one seat 108 for an operator of the machine 100.

In the described embodiment machine 100 can create two growing rows at one pass over the top of the raised bed 20.

A pivot arm 115 is provided lengthwise across the frame 110 and parallel to the raised bed 20 with a burner 120 and auger 125.

As the machine 100 moves forward, either by being pulled by a tractor, or through motorized self-propulsion, the burner 120 burns each hole 25 in the barrier 30 and the auger 125 follows to drill out the soil of the pre-burned fabric hole 25 to create the socket hole 26.

In an embodiment of the invention, a soil catch plate 127 (FIG. 8) is provided for surrounding the burned fabric hole as the auger 125 is actuated downward. The catch plate 127 catches the soil being drilled from the hole 26. After the hole 26 has been drilled, the dirt plate 127 lifts up simultaneously with the auger 125 to dump the dirt to the side of raised bed 20, i.e., in the open row between each bed 20. Accordingly, the hole 25 burning and hole 26 drilling happen simultaneously.

In one embodiment, the burner 120 and auger 125 are engaged when an operator at seat 108 activates a hydraulic switch of hydraulic switch panel 130 (FIG. 9). Referring to FIGS. 8 and 10, the auger 125 and burner 120 up and down movements are controlled by hydraulics at the aforementioned hydraulic switch panel 130. The operator activates the desired control to initiate rotation of the shaft 115 which rotates to cause the pair of arms 128 at each of the burner 120 and auger 125 to move upward and downward as desired to burn and dig the respective container holes 26. Preferably, the auger 125 includes a hydraulic motor, actuated by the controls, for drilling into the raised bed.

Spacing for the holes may be adjusted and the hole size diameters may be also adjusted to fit various container sizes with the apparatus of the present invention. In one embodiment, a hole-calibrating wheel measurement device/cog allows a pin/gear or similar measuring monitor to be set a desired radius to control the distance between holes. When the monitor travels a desired circumference length (corresponding to a hole distance), a sound or notch-like impeding motion occurs to alert the operator that the next hole distance is reached for activating the burner 120 and auger 125. Those of ordinary skill in the art will appreciate that such wheel-like measuring devices are well-known.

After the machine has drilled holes 26 into raised bed 20, the bed is ready to received the container plant 40 and plant 50. Prior to inserting the container 40 with the plant 50, the container 40 is preferably wrapped with a non-woven polypropylene material 75 as previously described.

In still further embodiments of the present invention, growers may use a sleeve pot, much like the "pot-in-pot" growing system used for larger containers. However, a disadvantage of this technique is that plants may still root through the extra drain holes of the sleeve pot into the soil 10 of the raised bed 20. Thus, the grower cannot readily remove the container plant 50 from the raised bed 20 in an efficient manner. Also, the use of an additional container 40 increases production costs. Instead, the fabric wrapping 75 of an embodiment of the present invention may be purchased in large rolls or pre-cut from most nursery supply companies. Further, although "pot-in-pot" systems are typically applicable for 7–25 gallon container plants, the fabric wrapping method described herein is not limited to 1–5 gallon container production, and can be used with larger container plants.

Although the present invention has been described in specific detail with reference to the disclosed embodiments, it will be understood that many variations and modifications may be affected within the spirit and scope of the invention as described in the following claims.

What is claimed is:

1. A planting bed for plants in a container comprising:
  a. a raised planting bed;
  b. a weed-deterring material covering the raised planting bed;
  c. a plant in a container contained in a hole in the raised planting bed;
  d. a water line directed to the plant in a container, and
  e. a temperature controlling line beneath the weed-deterring material for controlling the bed temperature, wherein the temperature controlling line is a driptape.

2. The planting bed of claim 1, further comprising a rooting-deterrent material between the plant in a container and the hole in the raised bed.

3. The planting bed of claim 2, wherein the rooting-deterrent material includes polypropylene fabric.

4. The planting bed of claim 1, wherein the water line includes a spray emitter and is an individual line to the plant in a container.

5. The planting bed of claim 4, wherein the spray emitter is attached to a container holding the plant in a container.

6. The planting bed of claim 2, wherein the water line includes a spray emitter and is an individual line to the plant in a container.

7. The planting bed of claim 1, wherein the plant in a container is wrapped in a rooting-deterrent material.

8. The planting bed of claim 7, wherein the rooting-deterrent material includes polypropylene fabric.

9. A method for growing plants in a container comprising:
  a. providing a plant in a container in a raised bed, wherein the raised bed includes a cover material and wherein the cover material is a water-permeable weed barrier;
  b. providing a temperature control line beneath the cover material to control temperature in the raised bed surrounding the plant in a container, wherein the temperature control line includes driptape and moistens the bed surrounding the plant in a container; and
  c. providing a water line for hydrating inside the plant in a container wherein the water line includes a spray emitter.

10. The method of claim 9, farther comprising providing a rooting-deterrent material between the plant in a container and the raised bed.

11. The method of claim 9, further comprising providing a plurality of plants in a container in the raised bed and providing each plant in a container with an individual water line.

12. The method of claim 11, wherein each individual watering line includes a spray emitter for watering each plant in a container.

13. A method for growing container plants comprising:
a. providing plant in a container in a raised bed, wherein the raised bed includes a cover material and wherein the cover material is a water-permeable weed barrier
b. providing a temperature control line beneath the cover material to control temperature in the raised bed surrounding the plant in a container;
c. providing a watering line for hydrating inside the plant in a container; and
d. providing a rooting-deterrent material between the plant in a container and a hole in the bed holding the plant in a container.

14. The method of claim 13, wherein the temperature control line moistens the bed surrounding the plant in a container.

15. The method of claim 14, wherein the water line includes a spray emitter.

16. The method of claim 13, wherein the watering line includes a spray emitter.

17. The method of claim 13, further comprising providing a plurality of plants in a container in the raised bed and providing each plant in a container with an individual watering line.

* * * * *